July 18, 1967 J. VANDER HORST 3,331,289

FORCE AMPLIFIER AND POSITIONER

Original Filed Dec. 30, 1963

INVENTOR.

JOHN VANDER HORST

BY

Van Valkenburgh + Lowe

ATTORNEY

United States Patent Office 3,331,289

Patented July 18, 1967

3,331,289

FORCE AMPLIFIER AND POSITIONER

John Vander Horst, Englewood, Colo., assignor to Floyd K. Haskell, Allen D. Gray and James A. Krentler, trustees, Denver, Colo.

Original application Dec. 30, 1963, Ser. No. 334,439, now Patent No. 3,257,912, dated June 28, 1966. Divided and this application June 28, 1966, Ser. No. 561,155

9 Claims. (Cl. 91—390)

This application is a division of my copending application Ser. No. 334,439, filed Dec. 30, 1963, now U.S. Patent No. 3,257,912 of June 28, 1966, in turn a continuation-in-part of my application Ser. No. 271,027, filed Apr. 5, 1963 (now abandoned).

This invention relates to fluid operated force amplifiers and positioners. For the control of various types of equipment or parts thereof, such as for operating valves, chucks, positioning devices, actuating devices, compressing devices, opening devices, closing devices, and other elements or parts, particularly when the control force is of small magnitude and the force necessary to operate the part or device being controlled is of considerably greater magnitude, it is desirable to provide a force amplifier. Such a force amplifier should be linearly responsive to the control force, should require a minimum a minimum of power for actuation, and should retain the position of the controlled part or device, within the limits of accuracy required for the operation being carried out. Since a supply of fluid, either air or other gaseous fluid, as well as hydraulic fluid, is normally readily available, such a force amplifier is conveniently fluid operated.

Among the objects of this invention are to provide a novel, fluid actuated force amplifier and positioner; to provide such a force amplifier which requires a minimum of force for actuation; to provide such a force amplifier which will be positive in its response to the actuating force; to provide such a force amplifier which may be controlled within relatively narrow limits; to provide such a force amplifier which may be controlled by a solenoid or similar device; to provide such a force amplifier which is relatively simple in construction; and to provide such a force amplifier which is efficient and effective in operation.

Additional objects and the novel features of this invention will become apparent from the description which follows, taken in conjunction with the accompanying drawings, in which.

Figure 1:
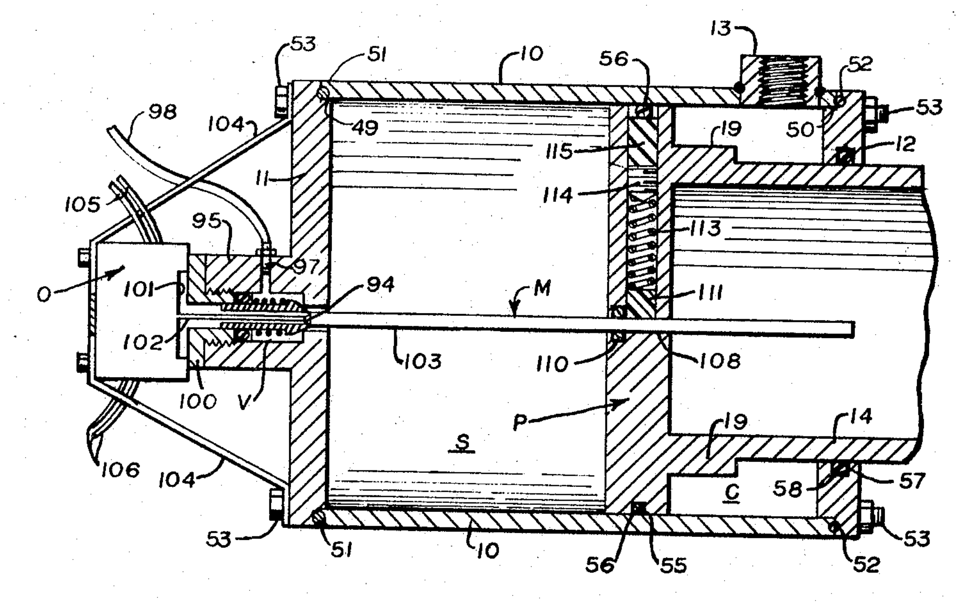
FIG. 1 is a fragmentary, longitudinal section of a fluid operated force amplifier constructed in accordance with this invention.

As illustrated in FIG. 1, a force amplifier constructed in accordance with this invention may include a tubular cylinder 10, the opposite ends of which are closed by end walls 11 and 12 and to which a fluid, such as compressed air or a hydraulic fluid, may be supplied through an inlet connection 13. A piston P is mounted within cylinder 10 and is provided with a conveniently cylindrical, hollow piston rod 14 adapted for connection to the part or device to be controlled, such as a rod, tube or the like which is connected to the part or device to be controlled. The air or hydraulic fluid supplied at inlet connection 13 may be at a constant pressure, so as to maintain a constant force against the piston P around piston rod 14.

The area on opposite sides of piston P differs, since on one side, the full area of the piston is exposed to the fluid in cylinder 10, while on the opposite side, the pressure area is restricted to that around the piston rod 14 and a reduced section of the piston having a shoulder 19, the former of which preferably corresponds to the outer diameter of piston rod 14. Thus, a primary pressure chamber C is provided on the reduced area side of piston P, while a secondary pressure chamber S is provided on the opposite side of the piston. The full pressure of fluid is exerted in primary pressure chamber C, while a lower pressure is normally exerted in secondary chamber S. Assuming that the piston area exposed to the pressure in primary chamber C is one half of the piston area exposed to the pressure in secondary chamber S, when the pressure in chamber S is one half of the pressure in chamber C, the piston will be in a balanced condition. However, if the pressure in chamber S is increased, the piston P and piston rod 14 will be moved to the right, as viewed in FIG. 1, while if the pressure in chamber S is reduced, the piston P and its piston rod 14 will be moved to the left.

In accordance with this invention, the pressure in chamber S is controlled, through a control member M which is operated by a double acting solenoid O, with the control member M extending through a hollow valve V which controls the flow of fluid to secondary chamber S and through which fluid is exhausted from the secondary chamber S. Control member M is provided with a valve 94 adapted to seat against the inner end of the hollow valve V, for permitting such exhaust when moved inwardly, and also is adapted to open valve V when moved outwardly. Control member M also extends through piston P and is slidable inwardly and outwardly therethrough, so that the piston may move without changing the opening of valve V or the opening of valve 94, when the control member M is moved to a position corresponding thereto by solenoid O. However, piston P is provided with a friction device or other suitable force applying means, as described below, which permits such sliding of control member M, but causes the control member to move with the piston when not held by the solenoid, so as to maintain the piston in any set position, in a manner explained later.

Cylinder 10 fits over shoulders 49 and 50 of the respective end walls and is sealed, as by O-rings 51 and 52. The cylinder 10 is held between the end walls by bolts 53, the end walls preferably extending beyond the cylinder, as through a rectangular configuration. Also, the piston is provided with a groove 55 which receives a seal, such as an O-ring 56, while end wall 12 is provided with a groove 57 which receives a seal, such as an O-ring 58, for piston rod 14.

Figure 2:
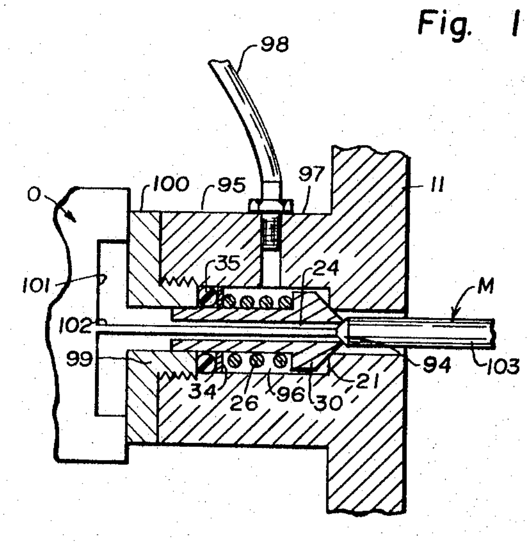
FIG. 2 is a fragmentary section corresponding to a portion of FIG. 1, on an enlarged scale.

The end wall 11 is provided with an axial extension 95 containing a passage 96, at the inner end of which, as in FIG. 2, is formed a seat 21 for the head 30 of the hollow valve V, having a central passage 24. Seat 21 may be provided by a shoulder, as shown, or by a ring. Valve V is urged toward its seat by a coil spring 26, one end of which abuts head 30 of the valve and the opposite end of which abuts a washer 34, which also holds a seal for the stem of valve V, such as an O-ring 35, in position. Fluid under pressure for the secondary chamber S is supplied to passage 96 through a hole having threads to receive an inlet connection 97, in turn connected to a hose 98. The threaded stem 99 of a bushing 100 is received in the outer end of passage 96, for securing valve V in position, it being noted that the rear end of the valve is movable within the bushing. A slot 101 in solenoid O permits fluid to be exhausted from the secondary pressure chamber S, through the passage 24 in valve V to atmosphere, in the event that the pressure fluid being utilized is air. Or, a suitable connection may be made at bushing 100 for return of the fluid to a tank or sump, in the event that a preferably recovered fluid, such as oil, is used.

The control member M, as indicated previously, is provided with valve 94, which engages a seat formed at the inner end of the central passage in valve V, and the control member thus preferably includes a smaller rod 102 between solenoid O and valve 94 and a larger rod 103 between valve 94 and the opposite end of the control member. The length of rod 103 is preferably such that movement of piston P to the opposite end of the cylinder will be accommodated.

Solenoid O may be secured in position by a bracket 104 which extends between two or more of the bolts 53 and holds the solenoid against bushing 100. The solenoid O is preferably double acting, thus having two windings, one of which, when energized, will move the control member M inwardly, as by current supplied through wires 105, and the other of which, when energized, will move the control member M outwardly and the valve V along with it, as by current supplied through wires 106. It will be understood, of course, that the solenoid windings may be connected to a common wire, in which event only three control wires will be necessary.

As will be evident, when solenoid O moves control member M outwardly, valve V will be moved outwardly with the control member, against the pressure of spring 26, thereby permitting fluid to flow from inlet connection 97 through passage 96 and into the secondary pressure chamber S. Due to the difference in the effective area on opposite sides of the piston, when substantially the same pressure is introduced into the secondary chamber S as the primary chamber C, the piston will be moved to the right, as viewed in FIG. 1. Similarly, when the control member M is moved inwardly by solenoid O, valve V will become seated, if not already seated, and control member valve 94 will be unseated, permitting the fluid in secondary chamber S to be exhausted through the hollow valve V and out through slot 101. This will reduce the pressure in secondary chamber S, so that the piston will be moved to the left, again as viewed in FIG. 1. As will be evident, the respective winding of solenoid O may remain energized until the piston rod 14 has been moved outwardly or inwardly any desired distance, as required. The pressure of fluid supplied to inlets 13 and 96 also may be so proportioned that the piston will be moved faster in one direction than the other. Of course, when tube 98 is connected to the same source of supply of fluid as for inlet connection 13, as at a T in the fluid supply line, a portion of the fluid supplied through tube 98 may be fluid which is exhausted from chamber C through movement of the piston P to the right, as viewed in FIG. 1. Thus, in effect, fluid will pass inwardly and outwardly through connection 13, from and to the source of supply thereof, as piston P moves to the left and right, respectively; in the conventional arrangement, this is readily accommodated by the accumulator normally used in fluid lines.

Figure 3:
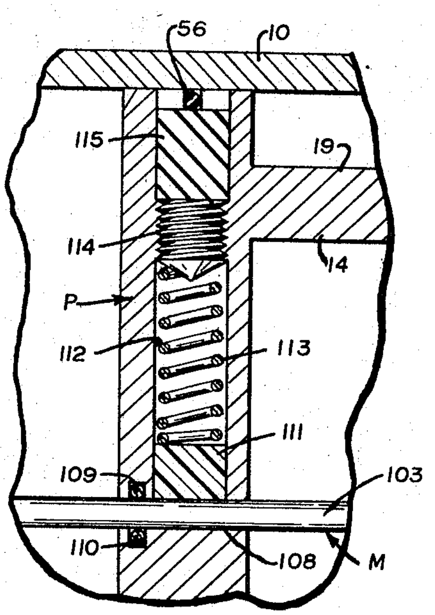
FIG. 3 is a fragmentary section corresponding to another portion of FIG. 1, on an enlarged scale.

Rod 103 of control member M, as in FIG. 3, extends through a hole 108 in piston P, having a groove 109 adjacent secondary chamber S, in which an O-ring 110 is received, for sealing purposes. At times when neither winding of solenoid O is energized, the force of piston rod 14 may vary, so that it is desirable to maintain the piston and piston rod automatically in any position in which set. For this purpose, when the friction provided by O-ring 110 is insufficient, an additional friction or force applying device, such as a friction block 111, is utilized to permit rod 103 to slip inwardly and outwardly in the piston, as the piston is moved under the control of the solenoid O, but to cause the rod 103 to move with the piston when the solenoid is deenergized. Thus, any tendency for the piston to be shifted from its position due to a variation in the force on piston rod 14, from either a pushing or pulling force will be counteracted, since any force tending to move the piston to the left, as viewed in FIG. 1, will cause valve V to be lifted off its seat, permitting additional fluid to flow into secondary chamber S through inlet connection 97, thereby reestablishing the position of the piston and the piston rod. Similarly, if a variation in force on the piston rod 14 tends to cause the piston and piston rod to move to the right, again as viewed in FIG. 1, such movement will cause valve 94 on control member M to be lifted off its seat, thereby permitting fluid to be exhausted from secondary chamber S, until the piston and piston rod resume their previous position. In this manner, the position of the piston rod 14 may be maintained automatically, after it is set in a particular position by control through solenoid O.

Friction block 111 is conveniently formed of nylon or other suitable material and, as in FIG. 3, is disposed at the inner end of a radial hole 112 in the piston, block 111 being held against rod 103 by the preferably substantially constant force of a coil spring 113, the outer end of which abuts against a set screw 114, adjusted to a desired position in a threaded portion of hole 112. The outer portion of hole 112 may be occupied by a plug 115, of rubber, neoprene or the like. The outer end of plug 115 may be flat beneath O-ring 56, as shown, or may extend outwardly substantially to the inside wall of cylinder 10 and be provided with a groove for receiving the O-ring 56. As will be evident, a friction force or other restrictive force may be applied to rod 103 in any other suitable manner. The force exerted by coil spring 113 may be calibrated, at the factory, through proper adjustment of the set screw 114, so that the force which resists movement of rod 103 in the piston, comprising the friction produced by block 111 and the normally smaller amount of friction produced by O-ring 110, will be sufficient to overcome the force exerted by spring 26 on valve V. Of course, the force exerted by the solenoid should be greater, in one direction, than the force resisting movement of the control rod in the piston and, in the other direction, the latter force and the force exerted by spring 26. As will be evident, the pressure in chamber S, against the end of valve V, will assist the solenoid in opening valve V against the pressure of spring 26, thus reducing somewhat the force necessary for the solenoid to produce.

The fluid operated force amplifier and positioner of this invention is particularly adapted to be utilized in opening and closing valve, either fluid valves or other valves, as well as adjusting the position thereof, or sliding or swinging gates or partitions which control the flow or movement of solid material, such as ore, crushed rock, gravel, chemical materials and the like. As will be evident, the control force exerted by solenoid O may be quite small, in comparison with the force produced by fluid pressure against the piston and necessary to open, close or adjust, such valves, gates or partitions. Applications of this invention include refinery valves, hopper discharge gates, conveyor feed and discharge gates and clamping devices, as well as other which will be evident to those skilled in the art. It will be noted that the amount of movement of the control member by the solenoid is considerably smaller than the movement of the piston rod and the corresponding movement of the device or element which is controlled. Thus, the control member M may be moved manually, as by a lever connected to the outer end thereof, so that when the lever is pushed in one direction, the piston and piston rod will be moved to the right, as viewed in FIG. 1, and when the lever is pulled in the opposite direction, the piston and piston rod will be moved to the left, again as viewed in FIG. 1. As will be evident, the lever may be held in one direction, to cause the piston and piston rod to move to the end of the path of travel thereof in a desired direction, as when opening or closing a valve or gate or the like. As will also be evident, any other type of actuating device may be utilized for moving the control member M.

Although a preferred embodiment of this invention has been illustrated and described, it will be understood that other embodiments may exist and that various changes and variations may be made, without departing from the spirit and scope of this invention.

What is claimed is:

1. A fluid operated force amplifier comprising:
a hollow cylinder having closed ends;
a piston movable longitudinally within said cylinder and having a piston rod extending through one end of said cylinder, said piston and piston rod providing a primary pressure chamber on one side of said piston and said piston providing a secondary pressure chamber on the opposite side of said piston, the area of said piston exposed to fluid pressure in said secondary chamber being greater than the area of said piston exposed to fluid pressure in said primary chamber;
an inlet connection for supplying fluid under pressure to said primary pressure chamber;
means for supplying fluid under pressure to said secondary chamber, said means including a passage provided with a valve seat;
a valve movable into and out of engagement with said seat for controlling flow of fluid through said passage;
means for urging said valve toward said seat;
a control member extending from a point exteriorly of said cylinder and through said piston, for moving said valve away from said seat;
said piston being provided with restraining means for engaging said control member with sufficient force to cause said control member to move with said piston to open said valve;
means for moving said control member and constructed and arranged to exert a greater force on said control member than said restraining means; and
discharge means for controllably discharging fluid from said secondary chamber.

2. A force amplifier, as defined in claim 1, wherein:
said discharge means includes an auxiliary valve; and
said first mentioned valve is provided with a seat for said auxiliary valve.

3. A force amplifier, as defined in claim 2, wherein:
said control member comprises a rod having said auxiliary valve mounted thereon.

4. A force amplifier, as defined in claim 1, wherein:
said valve has a longitudinal passage therethrough and through which fluid may be discharged from said secondary chamber.

5. A force amplifier, as defined in claim 4, wherein:
said valve is provided with a seat; and
said control member is provided with a valve for engaging said seat of said first valve.

6. A force amplifier, as defined in claim 1, including:
a solenoid means disposed exteriorly of said cylinder for moving said control member.

7. A fluid operated force amplifier comprising:
a hollow cylinder having closed ends;
a piston movable longitudinally within said cylinder and having a piston rod extending through one end of said cylinder, said piston and piston rod providing a primary pressure chamber on one side of said piston and said piston providing a secondary chamber on the opposite side of said piston, the area of said piston exposed to fluid pressure in said secondary chamber being greater than the area of said piston exposed to fluid pressure in said primary chamber;

means for supplying fluid under pressure to said primary pressure chamber;
means including a passage, provided with a first valve seat, for supplying fluid under pressure to said secondary chamber;
a hollow valve disposed in said passage and engageable with said first valve seat for controlling the flow of fluid to said secondary chamber, said hollow valve having a second valve seat;
a control rod extending through said piston and through said hollow valve, said rod having a valve engageable with said second valve seat so as to move said hollow valve away from said first valve seat, when said rod is moved relative to said hollow valve in one direction, and to move said rod valve away from said second valve seat, when said rod is moved relative to said hollow valve in the opposite direction;
means for effecting exhaust of fluid from said secondary chamber through said hollow valve when said rod valve is moved away from said second seat;
means exteriorly of said cylinder for moving said control rod in opposite directions, respectively to move said hollow valve away from said first seat and to move said rod valve away from said second seat; and
means carried by said piston for restraining movement of said control rod and tending to cause said control rod to move with said piston.

8. A fluid operated force amplifier, as defined in claim 7, including:
double acting solenoid means adjacent the end of said cylinder opposite said piston rod for moving said control rod in opposite directions, said passage and said hollow valve being disposed between said solenoid means and said secondary chamber;
friction means associated with said piston and engaging said control rod, for causing said control rod to move with said piston except when restrained by said solenoid means and also permitting said control rod to slide in either direction in said piston.

9. A force amplifier, as defined in claim 8, wherein said friction means comprises:
a friction block engaging said control rod and disposed at the inner end of a generally radial passage in said piston;
a spring in said passage and engaging said block;
an adjustable stop in said passage and engaging the outer end of said spring;
a filler block in said passage disposed outwardly of said stop; and
said piston having a circumferential groove therein adapted to receive a sealing ring, said radial passage extending to said groove.

References Cited

UNITED STATES PATENTS

| | | | |
|---|---|---|---|
| 1,891,312 | 1/1932 | Knecht | 91—395 |
| 2,059,446 | 11/1936 | Eastman | 92—29 |
| 2,531,907 | 11/1950 | Daubenmeyer | 92—29 |
| 2,877,743 | 3/1959 | Liaaen | 91—390 |
| 3,023,739 | 3/1962 | Dickson et al. | 91—417 |
| 3,200,713 | 8/1965 | Viersma et al. | 91—390 |

MARTIN P. SCHWADRON, *Primary Examiner.*

PAUL E. MASLOUSKY, *Assistant Examiner.*